United States Patent
Zaheer et al.

(10) Patent No.: US 9,838,387 B2
(45) Date of Patent: Dec. 5, 2017

(54) SECURITY TOKEN WITH EMBEDDED DATA

(71) Applicants: Nouman Zaheer, Mississauga (CA); Paul J. Davies, Oakville (CA)

(72) Inventors: Nouman Zaheer, Mississauga (CA); Paul J. Davies, Oakville (CA)

(73) Assignee: Management Systems Resources Inc., Toronto (CA)

( * ) Notice: Subject to any disclaimer, the term of this patent is extended or adjusted under 35 U.S.C. 154(b) by 103 days.

(21) Appl. No.: 14/698,280

(22) Filed: Apr. 28, 2015

(65) Prior Publication Data

US 2016/0323269 A1 Nov. 3, 2016

(51) Int. Cl.
*H04L 29/06* (2006.01)
*G06F 21/00* (2013.01)
*H04W 12/10* (2009.01)
*H04W 12/06* (2009.01)
*H04W 12/04* (2009.01)

(52) U.S. Cl.
CPC ......... *H04L 63/0846* (2013.01); *G06F 21/00* (2013.01); *H04L 63/123* (2013.01); *H04W 12/04* (2013.01); *H04W 12/06* (2013.01); *H04L 63/166* (2013.01)

(58) Field of Classification Search
CPC . H04L 63/0846; H04L 63/123; H04L 63/166; G06F 21/00; H04W 12/10; H04W 12/06; H04W 12/04

USPC ............................................................. 726/7
See application file for complete search history.

(56) References Cited

U.S. PATENT DOCUMENTS

| | | | |
|---|---|---|---|
| 2005/0071328 A1* | 3/2005 | Lawrence | G06F 17/30867 |
| 2015/0067328 A1* | 3/2015 | Yin | H04L 63/0807 |
| | | | 713/168 |
| 2015/0220912 A1* | 8/2015 | Holdsworth | G06Q 20/353 |
| | | | 705/72 |
| 2015/0319174 A1* | 11/2015 | Hayton | H04L 63/10 |
| | | | 726/7 |
| 2015/0373015 A1* | 12/2015 | Mary | H04L 63/0853 |
| | | | 726/9 |
| 2016/0191600 A1* | 6/2016 | Scharber | H04L 41/0806 |
| | | | 709/223 |

* cited by examiner

*Primary Examiner* — Kambiz Zand
*Assistant Examiner* — Benjamin Kaplan
(74) *Attorney, Agent, or Firm* — Tysver Beck Evans, PLLC

(57) ABSTRACT

A system and method are presented that provide authentication tokens to a local device from a remote server. The authentication token incorporates standard token content, and also includes additional token components that are needed by the local device. The additional token components incorporate user preferences information, initialization data, or other useable information needed by the local device. In contrast to standard processes, which must return a security token to the local device before any useful data can be exchanged, the disclosed embodiment inserts useable data into the returned token and eliminates the time required to obtain this data through a separate data request.

20 Claims, 4 Drawing Sheets

SECURITY TOKEN WITH EMBEDDED DATA

FIELD OF THE INVENTION

The present application relates to the field of secure communications. More particularly, the present application relates to the passing of security tokens between computing devices during the initiation of communications.

SUMMARY

The present invention is directed toward decreasing the time it takes to establish secure communications between a local computing device and a remote server. In contrast to standard processes, which must return a security token to the local device before any useful data can be exchanged, the disclosed embodiment inserts useable data into the returned token. This eliminates the need for the app to request that data after the token has been received.

DETAILED DESCRIPTION

System 100

Figure 1:
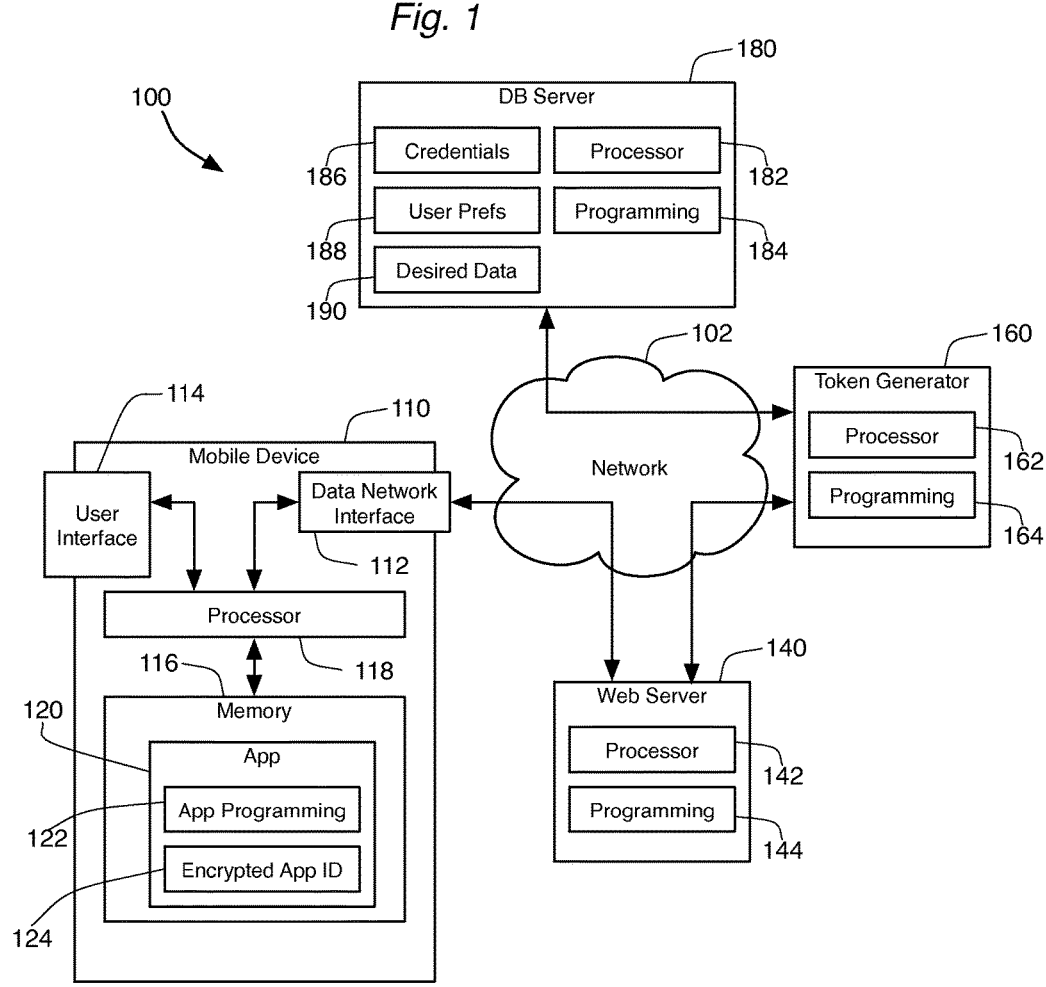
FIG. 1 is a schematic view of a system that utilizes the present invention.

FIG. 1 shows a system 100 in which a mobile device 110 communicates over a network 102 with a web server 140 to receive data that is useful to the user of the mobile device 110. In other embodiments, the mobile device 110 is replaced by a local computer, such as a desktop or laptop personal computer. For the sake of this discussion, the invention will be described showing a mobile device 110 that utilizes a security token to receive data from the web server 140. Furthermore, the use of a "web server" in this description should be considered as part of an exemplary embodiment and not a limitation on the invention. Apps running on a mobile device 110 frequently access web pages from a web server 140 through standard http requests like a standard web browser. However, it is well known in the industry that mobile device apps can access data directly from a remote server without using standard web protocols. In these circumstances, the mobile device 110 will communicate with a remote server that does not take the form of a "web server."

In FIG. 1, mobile device 110 uses a network interface 112 to communicate over network 102 with the web server 140. In the preferred embodiment, the network 102 is a wide area network (WAN) such as the Internet. The data network interface 112 may connect directly to the WAN 102, or can communicate with the network 102 by first connecting to a local wireless network that provides connection to network 102. The network interface 112 may connect to the network 102 using one of the Institute of Electrical and Electronics Engineers' (IEEE) 802.11 standards (commonly known as WiFi). If the network 102 is based on TPC/IP, the data network interface 112 will implement a TCP/IP protocol stack to manage the communications. In other embodiments, the network 102 is formed in part by a cellular data network. In these embodiments, the network interface 112 may take the form of a cellular communication interface.

The mobile device 110 may take the form of a smart phone or tablet computer that provides data and receives input through a user interface 114 of the device 110. The user interface 114 may consist of display screens, buttons, keys, or touch-screen elements. The interface 114 is managed by a program or "app" 120 that is stored on the non-transitory memory 116 of the device 110. The app 120 consists primarily of app programming 122, which provide instructions to a processor 118 operating on the mobile device 110. The processor 118 can be a general purpose CPU, such as those provided by Intel Corporation (Mountain View, Calif.) or Advanced Micro Devices, Inc. (Sunnyvale, Calif.), or a mobile specific processor, such as those using designs by ARM Holdings (Cambridge, UK). Mobile devices such as device 110 generally use specific operating systems designed for such devices, such as iOS from Apple Inc. (Cupertino, Calif.) or ANDROID OS from Google Inc. (Menlo Park, Calif.). The processor 118 is responsible for operating the app programming 122, managing the user interface 114, and handling all communications passing through the data network interface 112. In FIG. 1, the app 120 is also shown with an encrypted app ID 124. This app ID is a unique identifier for the app 120 and is used to help create secure communications with the web server 140, as is described in more detail below. In one embodiment, the app identifier 124 is incorporated into the programming 122 of the app 120, and is downloaded to the mobile device 110 from an app store in the same manner as other mobile device apps. The app identifier 124 is preferably stored in encrypted format to make it more difficult for malicious software to read this identifier 124.

In the preferred embodiment, communications between the mobile device 110 and the web server 140 are secured through an encryption and authentication process. Some of the data made available through the web server 140 may be confidential and appropriate only for particular recipients. In other cases, the data provided by the web server 140 is provided through a commercial arrangement, and users must log into the web server 140 in order to prove that they are active subscribers to the service. In either case, a mobile device user must authenticate herself to the web server 140 before requesting any data or services from the server 140. Unfortunately, the authentication process takes time, which slows down the response time of the app 120 running on the mobile device 110. To ensure that authentication does not need to occur before every request for data, the system 100 will provide the mobile device 110 with an authentication token after the user's credentials have been authenticated. This token can be used to provide proof that the user of the mobile device 110 is authenticated (the user is who they say they are) without having to repeatedly verify the user's credentials. In most cases, each token will have a limited lifespan (perhaps 10 minutes). When the token has expired, it may be necessary to re-authenticate the user. Such re-authentication may require that the user re-enter their user name and password. In other circumstances, these credentials will be stored on the mobile device and will automatically be sent as part of the re-authentication process when the token has expired. In still other embodiments, the token can be refreshed by the mobile device 110 without re-supplying the user's credentials.

Even when using an authentication token, users will frequently experience a frustratingly slow connection time with the web server 140 during initial authentication. This is because the user's credentials must be authenticated and a token created before any actual data can be downloaded through the web server 140. This is true even when the desired data is initialization data (such as use parameters or user preferences) that are always downloaded to the mobile device at the beginning of every session. The preferred embodiment shortens this connection time by embedding some of this initialization data within the token that is returned to the mobile device 110 in the initial authentication process.

In order to accomplish this, one embodiment of the system 100 shown in FIG. 1 uses a token generator computer 160 and a database server 180 to assist the web server 140 in authenticating the user and providing desired data. Each of these computers 140, 160, 180 includes a processor 142, 162, 182 that operates specific programming instructions 144, 164, 184, respectively. The processors 142, 162, 182 are preferably general purpose CPUs of the type provided by Intel Corporation or Advanced Micro Devices, Inc., operating under the control of a general purpose operating system such as Mac OS by Apple, Inc., Windows by Microsoft Corporation (Redmond, Wash.), or Linux (available from a variety of sources under open source licensing restrictions). Database server 180 is also shown as managing data for user credentials 186 and user preferences 188. In one embodiment, the credentials 186 are usernames and passwords for the users. These credentials 186 can be link to, or form part of, user database records maintained by the database server 180. These user records contain demographic information about the users, serve to link users to employers or other entities that purchase services from the web server 140, and contain preferences 188 established by the individual users or their employers. In one embodiment, not every user is able to access every element of data, and the database server 180 stores information that determines which data is available for access by which user.

First Method 200 and Token 300

Figure 2:
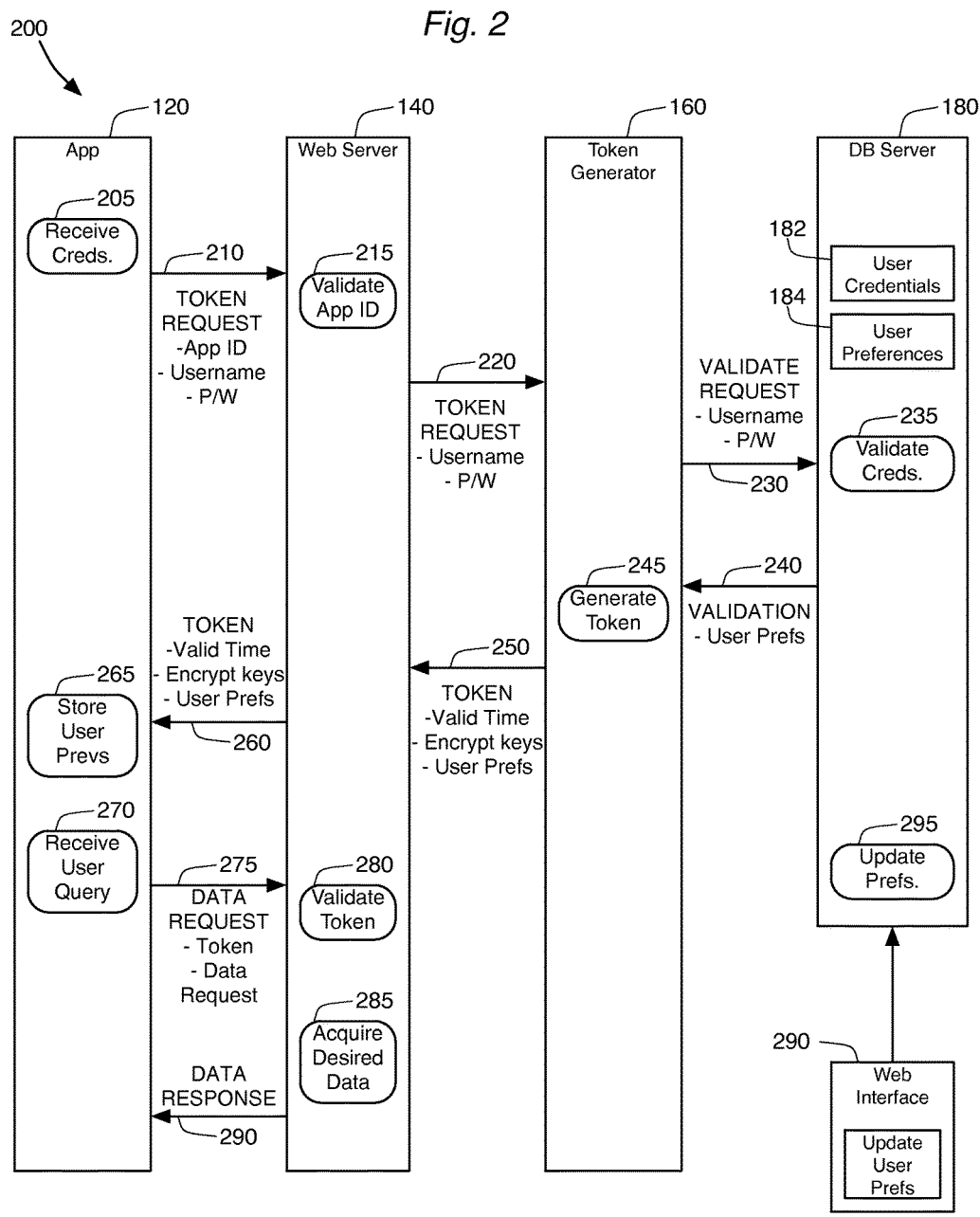
FIG. 2 is a schematic representation showing data flow and operations for one embodiment of the present invention.

The functions performed by the processors 118, 142, 162, 182, under the instructions of programming 122, 144, 164, 184 is shown in FIG. 2. In this figure, processes performed by the mobile device app 120 and the web server 140, token generator 160, and database server 180 are shown in ovals while communications between these elements 120, 140, 160, 180 (which take place over the network 102) are shown as arrows. In this way, FIG. 2 outlines a process 200 for implementing one embodiment of the present invention.

To begin using the app 120 to access data and services provided by the web server 140, the mobile device app 120 starts by requesting that the user of the device 110 provide their credentials at step 205. These credentials may be a username and a password that are entered by the user through the user interface 114. In some embodiments, the app 120 may store these credentials in the non-transitory memory 116 of the mobile device so that the user will not need to repeatedly re-enter this data. The app 120 will then transmit these credentials to the web server 140 as part of a token request 210. The token request 210 includes the credentials provided by the user as well as the encrypted app identifier 124 that is stored along with the app programming 122 in the memory 116 of the mobile device 110.

In the preferred embodiment, the mobile device 110 communicates with the web server 140 over a transport layer security (TLS) or secure socket layer (SSL) connection. These cryptographic protocols use well-understood encryption technologies to ensure that data communications between two devices are fully encrypted.

The web server 140 is now responsible for validating the user's credentials and returning a security token to the mobile device 110. The first step in this process is to validate the app ID 124. The purpose of this validation is to ensure that the token request 210 is coming from an actual user of the app 120 and not some other device operating a different program. In some embodiments, the app ID 124 will be unique to the mobile device 110, and perhaps may incorporate a hardware identifier included in the mobile device 110. In other embodiments, the app ID 124 is be unique to the app 120, but will be the same for all mobile devices 110 that are running the app 120. The app ID 124 may also incorporate the app's version number, so that the web server 140 will be able to identify the version of the app 120 running on the mobile device 110.

Assuming that the app ID 124 is valid, the next step 220 is for the web server 140 to request that the token generator 160 create an authorization security token for this communication session with the app 120. Note that the web server 140 has not authenticated the user's credentials at this point. Instead, the web server 140 sends the credentials to the token generator 160 as part of the request 220 for the token. In order to authenticate the user's credentials, the token generator 160 will need to communicate with database server 180, for it is the database server 180 that maintains the credentials 186 for all of the users of the web server 140. In the preferred embodiment, this communication takes the form of a validation request 230, which includes the user's username and password.

When the database server 180 receives the validation request 230, the server 180 will compare the included data with the stored credentials information 186. This validation step 235 will confirm that the username and password entered by the user at step 205 are consistent with a user stored in the user database. Step 235 will also ensure that the user is an active (paid-up) user. The database server 180 will also acquire other information about this user, such as the user's preferences 188 and an indication as to which data sources 190 are available for that user. Assuming that the database server 180 is able to validate the credentials, the additional acquired user information (collectively shown as the "user prefs" in FIG. 2) is then returned to the token generator 160 in a validation response 240.

When the validation response 240 has been received, the token generator 160 will generate a token for the user in step 245. As explained above, this token will not only serve to authenticate this user for a limited time, but will also serve as a vehicle to return the user preference information to the mobile device 110.

Figure 3:
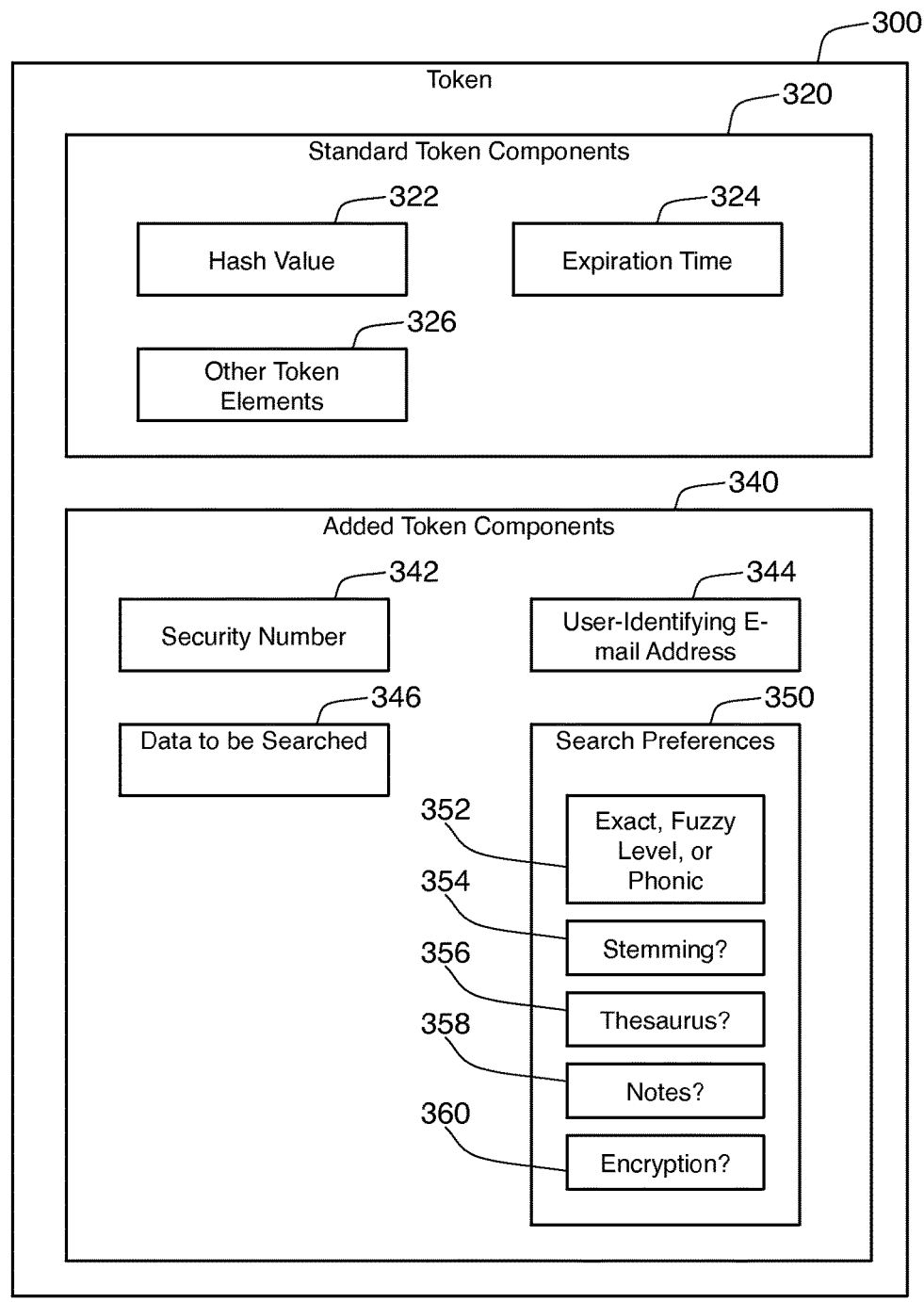
FIG. 3 is a schematic drawing of the content of an authentication token.

The content of this token is shown schematically in FIG. 3. The standard components 320 of a token 300 are those authentication token elements that are commonly found in most or all such tokens. In the preferred embodiment, the token 300 conforms to the OAuth (defined in Request for Comment—RFC—5849) or OAuth 2.0 specification (defined in Request for Comment—RFC—6749) as defined by the Internet Engineering Task Force (IETF). These standard components 320 include the hash value 322 and the expiration time 324 for the token 300. The expiration time 324 defines the time period during which this token 300 is valid. When the expiration time 324 has passed, the token is no longer valid and the user (mobile device 110) must request a renewed token (or otherwise refresh the token). Other components 326 are commonly found in standard tokens 300, including a name, an issuer, and an audience for the token 300. The content, format, and functioning of each of these standard token components 320 are well known in the art.

In the present invention, the token 300 also contains added token components 340. The components 340 are "contained" within the token 300, which meaning that these elements 340 are found inside that boundaries of the token 300 itself (which may be defined through tags, quotation marks, or other means as established by the specification that defines the protocol for the token 300) rather than sent along with the token 300 outside the boundaries of the token. These added components 340 comprise the data extracted by the database server 180 from its user data and included with the validation message 240 as part of the "user prefs." In the preferred embodiment, these user prefs constitute data that is specific for the user, and further is used by the app 120 in part to generate future requests for data or services from the web server 140.

The first element of the added token components 340 shown in FIG. 3 is the security number 342, which is used as a user identification number. In addition, the token 300 contains a user-identifying e-mail address 344. Because the token 300 will be submitted by the app 120 with each request for data, the web server will be able to extract this address 344 from the token and use the address for content delivery. In addition, the subset of the data 190 that is available for search by this user is included as element 346. As explained above, some users do not have access rights to all of the available data 190. This data element 346 indicates which data is available to the user.

Finally the search preferences 350 for this user are returned in the token 350. The search preferences 350 include variable settings that can be associated with a data search. These preferences may include a first variable 352 that indicates whether or not the terms included in a database query should be searched exactly, or with a fuzzy logic search, or with phonic equivalents. In some embodiments, different levels (such as 0-9) can be specified to indicate the degree of "fuzziness" to be applied to a search. The search preferences 350 also include variables to indicate whether stemming should be applied to search terms (354), whether thesaurus entries should be used to expand the search terms (356), whether notes entries should be searched by default (358), and whether encryption should always be used (360).

The data to be search 346 and the search preferences 350 can be used as default settings by the app 120. This allows central storage of preferences at the database server 180. As preferences, the app 120 may allow a user to alter the preferences on the mobile device 110 so that search queries sent to the web server 140 may include different parameters for the data to be search and the preferences when compared to that indicated by elements 346, 350 in the token 300. In one embodiment, a web interface 290 (shown in FIG. 2) is provided that directly accesses the database server 180. This interface 290 allows a user to alter the user preferences, which will cause the database server 180 to update the preferences 188 stored in its database (step 295).

In other embodiments, the data to be search 346 and the search preferences 350 might be set by an administrator working for the employer of the end users. The administrator would use the web interface 290 to alter the preferences 188 for the employer's end users. The administrator may further specify that these preferences (data to be searched 346 and search preferences 350) cannot be altered by the user. When changes need to be made to these elements 346, 350, the administrator will change them for all employees at once using the web interface 290. Alternatively, the administrator can be responsible for changing the preferences 188 for all users, but individual users can alter those preferences for individual searches made by on the user's mobile device 110.

The content of a sample OAuth token 300 is seen below in Table 1. This authentication token 300 contains standard token components 320 and added token components 340. The added token components 340 are presented as name-value pairs. In particular, the separated center portion of the token 300 includes values for "secno" (342), "searchpref" (350), "rpslist" (346) and "email" (344).

TABLE 1

WRAP
access_token="http%3a%2f%2fschemas.xmlsoap.org%2fws%2f2005%2f05%2fide
ntity%2fclaims%2f
name=wcfserviceIdentity&
secno=XXXXX&
searchpref=EXT%7cST0%7cTH0%7cFS0%7cEC0&
rpslist=12346&
email=XXXXX%40XXXXX.com&
Issuer=MyCustomIssuer&
Audience=http%3a%2f%2feim.visualcompliance.com%2fRPS_SP_WS%2fRPSSphon
eService.svc&
ExpiresOn=1419357127&
HMACSHA256=06sWN9IpUs0gB%2bEqtTcAQPoI2q06l27Kjm9I2IFjjxg%3d"

Returning to FIG. 2, when the token generator 160 has completed the generation of the token 300, the token is returned to the web server 140 in message 250. The web server 140 will then return the token 300 to the app 120 in message 260. When the token 300 has been received, the app 120 will examine the added token components 340 within the token 300 and then store the preferences 346, 350 that are embedded therein. This occurs at step 265. At this point, the app 120 is fully authenticated and ready to begin requesting data and services from the web server 140.

Without the inclusion of the added token components 340 in the token 300, the app 120 would receive the token 300 but would not have the centrally stored preference information 346, 350 which is necessary for the app 120 to generate requests to the web server 140. In this circumstance, it would have been necessary for the app 120 to request this preference information from the web server 140 using its newly acquired token, and then wait for the preference information to be retrieved from the database server 180 and returned from the web server 140. This would significantly decrease the responsiveness of the app 120 during this initial authentication stage.

When the app 120 is ready to request a query, the app 120 receives the user's query information at step 270 and sends a data request 275 to the web server 140. This data request includes both the token 300 and the actual database query generated by the app 120 based on the user's request. The web server 140 validates the token 300 at step 280 and then acquires the desired data 190 from the database server 180 at step 285. The desired data is then returned to the app in a data response message 290.

Second Method 400

Figure 4:
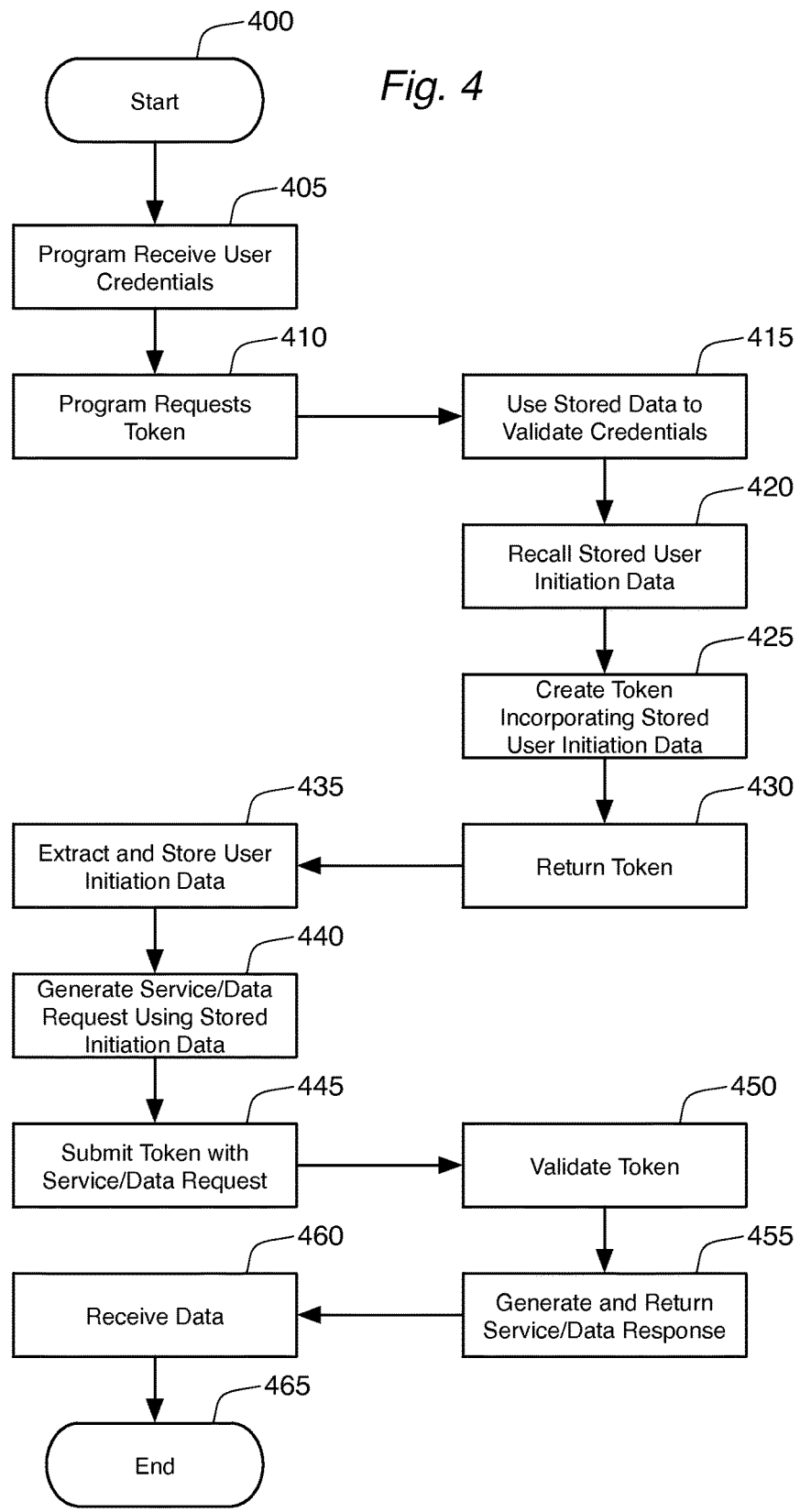
FIG. 4 is a flow chart showing a second embodiment process of the present invention.

The above discussion of system 100 and method 200 describes the interactions between the app 120 running on mobile device 110, a web server 140, a token generator 160, and a database server 180. Each of these elements 110, 140, 160, and 180 can exist and operate on separate computing devices as shown in FIG. 1. However, the basic method described above does not require this strict separation of devices. In fact, the method 400 shown in FIG. 4 requires only the operation of a local program on a local computing device and a remote server that authenticates a user and provides useful data or services. In FIG. 4, the primary steps of the method 400 are shown in two columns, with steps occurring on the local device shown in the left column and steps occurring on the remote server on the right column.

The method 400 starts at step 405, with a program operating on a local computing device requesting that a user enter their credentials. In some embodiments, these credentials can take the form of a user name and password for logging into the remote server. Once the credentials are received, the local program requests an authentication token from the remote server at step 410. This request includes the credentials received from the user.

At step 415, the remote server uses the credentials to authenticate the user. This step is generally performed by comparing the credentials received from the local program with stored data containing credentials for authorized users of the remote server. If the user's credentials are validated, the remote server will recall initialization data for the user. This initialization data is stored for the user by the remote server and is recalled using a user identifier that was included in the program request set in step 410. The initialization data may be an identification of the data and services that the user is authorized to receive (similar to data element 346 shown in FIG. 3), or search preferences (similar to element 350). The initialization data may also constitute other types of data that are required by the local program before a full request for data or services can be performed. The point of method 400 is to anticipate initialization data that will be needed by the local program and to gather and return that data as part of the token generation process.

At step 425, the remote server generates the authentication token and includes within the token the user initialization data gathered in step 420. At step 430, the remote server returns the token to the local program.

At step 435, the local program receives the token and extracts the initialization data from the token. This initialization data will then be used to generate a service request for the remote server in step 440. Note that FIG. 4 shows that the initialization data is stored by the local program in step 435. It is possible that the local program will accomplish this merely by retaining the token for re-use rather than storing the initialization data separate from the token. In most cases, however, the initialization data will be extracted and separately stored by the local program in order to provide the initialization data in the most convenient format possible for step 440.

Once the local program has generated the service or data request in step 440, the request is transmitted along with the authentication token to the remote server in step 445. The remote server then receives the token and validates it in step 450. Assuming the token remains valid and is otherwise authentic, the remote server will, at step 455, generate and return a response that provides the data or service results requested at step 445. The local program then receives this response at step 460, and the process ends at step 465.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method for authenticating electronic communications between a local device and a server computer system comprising:
   a) at the server computer system, receiving from the local device credentials for a user;
   b) at the server computer system, accessing stored user data and verifying the received credentials against the stored user data;
   c) at the server computer system, accessing local device initialization data specific for the user;
   d) at the server computer system, generating an authentication token for the user, the authentication token containing:
      i) a hash value,
      ii) an expiration time, and
      iii) the local device initialization data specific for the user;
   e) at the server computer system, transmitting the authentication token to the local device; and
   f) at the server computer system, receiving the authentication token along with a request from the local device, wherein the request was formulated by the local device using the local device initialization data specific for the user.

2. The method of claim 1, wherein the local device initialization data specific for the user comprises search preferences for the user.

3. The method of claim 2, wherein the search preferences further comprise a variable indicating whether exact or fuzzy string searching is to be used on search queries.

4. The method of claim 2, wherein the local device initialization data specific for the user further comprises a user-identifying communication address.

5. The method of claim 2, wherein the local device initialization data specific for the user further comprises an indication of data that is to be search through data queries submitted by the local device.

6. The method of claim 2, further comprising:
   g) at the server computer system, receiving a request to alter the search preferences for the user through a web interface and updating the stored user data to reflected the altered search preferences.

7. The method of claim 1, wherein the server computer system comprises a web server to communicate with the local device and a token generator to generate the authentication token.

8. The method of claim 7, wherein the server computer system further comprises a database server to store and retrieve data relating to the user including the stored user data.

9. The method of claim 8, wherein the server computer system comprises separate computing devices operating as the web server, the token generator, and the database server.

10. The method of claim 1, wherein the local device initialization data specific for the user forms part of the stored user data.

11. The method of claim 1, wherein the step of receiving from the local device credentials for a user further comprises receiving and verifying an application ID received from an application operating on the local device.

12. A method for authenticating electronic communications between a local device and a server computer system comprising:
   a) at the local device, identifying credentials for a user;
   b) at the local device, submitting a request for an authorization token to the server computer system wherein the request includes the credentials for the user;
   c) at the local device, receiving the authorization token, wherein, the authentication token contains:
      i) a hash value,
      ii) an expiration time, and
      iii) initialization data specific for the user;
   d) at the local device, receiving a user request through a user interface for data provided by the server computer system;
   e) at the local device, using the initialization data specific for the user along with the user request to formulate a data request;
   f) at the local device, transmitting the authentication token and the data request to the server computer system; and
   g) at the local device, receiving data from the server computer system in response to the data request.

13. The method of claim 12, wherein the initialization data specific for the user comprises search preferences for the user.

14. The method of claim 13, wherein the local device stores the search preferences outside the authorization token.

15. The method of claim 14, wherein the local device permits the user to alter the stored search preferences through the user interface.

16. A system for authenticating communications comprising:
   a) a server computer system containing a processor and programming instructions, the programming instructions causing the processor to:
      i) receive from a local device credentials for a user;
      ii) access stored user data and verify the received credentials against the stored user data;
      iii) access local device initialization data specific for the user;
      iv) generate an authentication token for the user, the authentication token containing:
         (1) a hash value,
         (2) an expiration time, and
         (3) the local device initialization data specific for the user;
      v) transmit the authentication token to the local device; and
      vi) receive the authentication token along with a data request from the local device, wherein the data request was formulated by the local device using the local device initialization data specific for the user.

17. The system of claim 16, further comprising:
   b) a mobile device operating as the local device, the mobile device containing a mobile device processor and app programming instructions, the app programming instructions causing the mobile device processor to:
      i) receive through a user interface the credentials for the user;
      ii) submit to the server computer system the credentials for the user;
      iii) receive the authentication token;
      iv) receive a user request through the user interface for data provided by the server computer system;
      v) use the local device initialization data specific for the user along with the user request to formulate the data request; and
      vi) transmit the authentication token and the data request to the server computer system.

18. A method for authenticating electronic communications between a local device and a server computer system comprising:
   a) at the local device, identifying credentials for a user;
   b) at the local device, submitting a request for an authorization token to the server computer system wherein the request includes the credentials for the user;
   c) at the local device, receiving the authorization token, wherein, the authentication token contains:
      i) a hash value, and
      ii) an expiration time,
   d) at the local device, determining whether the expiration time has been exceeded;
   e) at the local device, and after determining that the expiration time has been exceeded, submitting a request for renewal of the authorization token to the server computer system; and
   f) at the local device, after submitting the request for renewal, receiving a renewed authorization token.

19. The method of claim 18, wherein the request for renewal submitted to the server computer system includes the credentials for the user.

20. The method of claim 19, wherein the credentials for the user are stored at the local device after being identified in step a), and then recalled for submission with the request for renewal.

* * * * *